United States Patent Office 3,660,494
Patented May 2, 1972

3,660,494
CARBORANE PREPARATION FROM BORANES
Jerome F. Ditter, Covina, Eugene B. Klusmann, West Covina, and Robert E. Williams, La Canada, Calif., assignors to the United States of America as represented by the Secretary of the Navy
No Drawing. Filed Sept. 23, 1970, Ser. No. 74,851
Int. Cl. C07f 5/02
U.S. Cl. 260—606.5 B
5 Claims

ABSTRACT OF THE DISCLOSURE

An efficient method of synthesizing higher weight closo-carboranes by heating smaller molecular weight carboranes (5 borons or less per atom) with one of the smaller molecular weight boranes.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the invention

The present invention relates to a process which produces a high yield of higher molecular weight closo-carboranes from the combination of smaller molecular weight carboranes with smaller molecular weight boranes.

(2) Description of the prior art

Previous methods of making higher molecular weight closo-carboranes, including the species $C_2B_8H_{10}$ and $C_2B_{10}H_{12}$, have been produced from the relatively scarce and very expensive compound $B_{10}H_{14}$. This necessarily has severely limited the research and development of carborane based materials. However the present invention will remove the limited supply of the larger carboranes and open the field to accelerated development.

SUMMARY OF THE INVENTION

Thus, the present invention involves a novel method of synthesizing a relatively high molecular weight closo-carboranes by reacting a low molecular weight carborane with borane also of small molecular weight at an elevated temperature. This is a very significant and imporant advance in this field because it avoids the rare and expensive $B_{10}H_{14}$ intermediate and instead utilizes the simple and inexpensive small molecular weight boranes which are easily produced.

STATEMENT OF THE OBJECTS OF THE INVENTION

It is the object of the present invention to provide a method which will produce a high yield of closo-carboranes from a combination of small molecular weight carboranes and small molecular weight boranes.

Another object of the present invention is to provide a simple, efficient and economical way of producing high molecular weight closo-carboranes.

A further object of the present invention is to provide a method of producing high molecular weight closo-carboranes which avoids the use of the scarce and expensive borane $B_{10}H_{14}$.

Other objects, advantages and novel features of the invention will become apparent from the following detailed description of the invention.

DESCRIPTION OF THE PREFERRED EMBODIMENT

Broadly stated the present invention comprises a method of preparing closo-carboranes ranging from $C_2B_6H_8$ through $C_2B_{10}H_{12}$ by co-pyrolyzing a relatively small molecular weight carborane with a small molecular weight borane. The carboranes employed in the synthesis include $C_2B_4H_8$, $C_2B_3H_5$, $C_2B_4H_6$ and $C_2B_5H_7$ while the boranes are $B_2H_6$ and $B_5H_9$.

The following formula is illustrative of the synthesis:

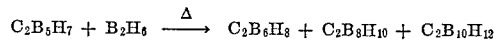

$$C_2B_5H_7 + B_2H_6 \xrightarrow{\Delta} C_2B_6H_8 + C_2B_8H_{10} + C_2B_{10}H_{12}$$

In one specific experiment, co-pyrolysis of $C_2B_5H_7$ (31 cc./min.) and $B_5H_9$ (18 cc./min.) at between about 500° C. to 750° C. and at 380 mm. pressure (absolute) under these conditions the nominal residence time in the heated zone is 12 seconds. A high yield of $C_2B_6H_8$, $C_2B_8H_{10}$ and $C_2B_{10}H_{12}$ was obtained.

It is emphasized that this synthesis is an important advance in the art because the use of $B_{10}H_{14}$ is avoided thus ensuring a plentiful and economic supply of higher molecular weight closo-carboranes. The heretofore limitation on carborane research may be removed and the field opened to accelerated development.

Obviously many modifications and variations of the present invention are possible in the light of the above teachings. It is therefore to be understood that within the scope of the appended claims the invention may be practiced otherwise than as specifically described.

We claim:
1. A process for preparing closo-carboranes comprising the steps of:
   heating a small molecular weight carborane having between 3 to 5 atoms of boron with a small molecular weight borane and;
   recovering the thus formed higher molecular weight closo-carboranes having not less than 6 atoms of boron.
2. A process as defined in claim 1 wherein:
   said heating of the carborane with the borane is carried out within the temperature range of 500–750 degrees centigrade.
3. A process as claimed in claim 1 wherein the small molecular weight carboranes are selected from the group consisting of $C_2B_4H_8$, $C_2B_3H_5$, $C_2B_4H_6$, and $C_2B_5H_7$ and the small molecular weight boranes are selected from the group consisting of $B_2H_6$ and $B_5H_9$.
4. A process as defined in claim 1 wherein the small molecular weight carborane is $C_2B_5H_7$ and the small molecular weight borane is $B_5H_9$ with the reaction temperature maintained at 750 degrees centrigrade and with the reaction carried out at 380 mm. pressure, absolute.
5. A process of preparing closo-carboranes having not less than 6 atoms of boron and characterized by the following reaction:

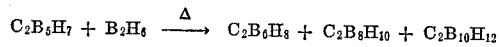

$$C_2B_5H_7 + B_2H_6 \xrightarrow{\Delta} C_2B_6H_8 + C_2B_8H_{10} + C_2B_{10}H_{12}$$

said reaction carried out at a temperature of between 500–750 degrees centigrade and at about 380 mm. pressure, absolute.

References Cited
UNITED STATES PATENTS
3,420,889  1/1969  Onak _____ 260—606.5 B DANIEL E. WYMAN, Primary Examiner
W. F. W. BELLAMY, Assistant Examiner